June 10, 1930.  L. V. ARONSON  1,762,753
INDICATING DEVICE
Filed May 3, 1928
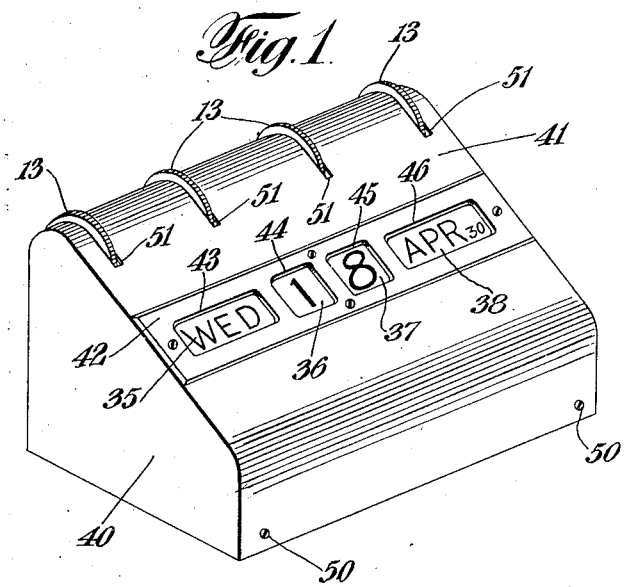
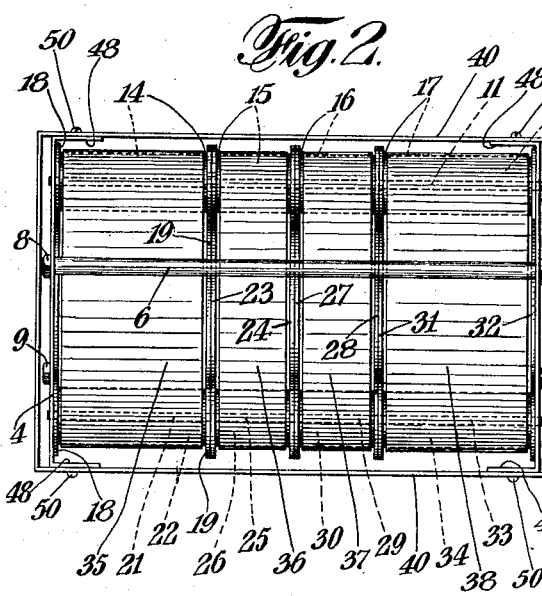
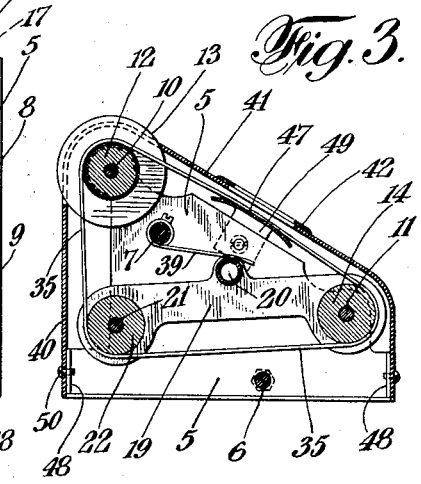
INVENTOR
Louis V. Aronson
BY
Ward + Crosby
ATTORNEYS Patented June 10, 1930

1,762,753

UNITED STATES PATENT OFFICE

LOUIS V. ARONSON, OF NEWARK, NEW JERSEY, ASSIGNOR TO ART METAL WORKS, INC., A CORPORATION OF NEW JERSEY

INDICATING DEVICE

Application filed May 3, 1928. Serial No. 274,689.

My invention relates to indicating devices and while the invention may be utilized in many different kinds of indicating devices, etc. the same is of particular utility and advantage in a perpetual calendar device, such as a desk calendar. The main object of the invention is to provide a device which is not only efficient in operation but which at the same time is simple and compact and of neat appearance. Further and more specific objects, features and advantages will more clearly appear from the detail description given below taken in connection with the accompanying drawings which form a part of this specification.

In the drawings, Fig. 1 is a perspective view of a desk calendar embodying my improvements in one form, Fig. 2 is a bottom view thereof and Fig. 3 is a transverse vertical section thereof.

Referring to the drawings, I there show a framework comprising two end plates 4 and 5 rigidly held in spaced relation by spacing rods 6 and 7 having reduced ends passing through holes in the plates 4 and 5 and provided with nuts 8 and 9 screwed up on the ends thereof. Secured in the framework are two axle rods or pins 10 and 11. Freely rotatable on the axle 10 are four rollers 12, each having rigidly secured thereto a thumb wheel 13, knurled on its periphery whereby it may be manually operated to rotate its roller and independently of the other rollers 12. Freely rotatable about the axle 11 are four rollers 14, 15, 16 and 17.

Pivotally mounted on the axle 11 are four frames. One frame comprises two side plates 18 and 19 held in spaced relation to one another by a spacing rod 20. The front ends of the plates 18 and 19 embrace the roller 14 while at their opposite ends the plates 18 and 19 carry an axle 21 on which a roller 22 is mounted to freely rotate. Another frame comprises two side plates 23 and 24 rigidly connected by a similar spacing rod and with their front ends journalled on the axle 11 and embracing the roller 15. At the opposite end the plates carry an axle 25 on which a roller 26 is mounted to freely rotate. Another frame comprises side plates 27 and 28 rigidly connected by a similar spacing rod and with their front ends journalled on the axle 11 and embracing the roller 16. At the opposite end the plates 27 and 28 carry an axle 29 on which a roller 30 is mounted for free rotation. A fourth frame comprises side plates 31 and 32 rigidly connected by a similar spacing rod and with their front ends journalled on the axle 11 and embracing the roller 17. At the opposite end the plates 31 and 32 carry an axle 33 on which a roller 34 is mounted to rotate freely.

Passing over the rollers 14, 22 and one of the rollers 12 is an endless tape 35 having thereon indicating characters such as "Sun", "Mon", "Tues", "Wed" etc. indicating the days of the week. Passing over the rollers 15, 26 and another of the rollers 12 is an endless tape 36 bearing indicating characters such as "1", "2" and "3". Passing over the rollers 16, 30 and another of the rollers 12 is an endless tape 37 having thereon indicating characters comprising the numerals "0", "1", "2", "3" and so on up to "9". Passing over the rollers 17, 34 and the last of the rollers 12 is an endless tape 38 having thereon indicating characters, such as "Jan", "Feb", "Mar", "Apr", etc. indicating the months of the year. The tapes are preferably composed of strips of white celluloid and after the designation of each month on the tape 38, may be placed a number indicating the number of days in that month. Each of the rollers 12 is provided with a suitable friction surface, such as a layer of emery paper, so that upon turning the roller by means of its thumb wheel 13 the roller will effectively drive the tape about its other rollers in order to bring the desired indicating characters thereon to viewing position. Secured to the rod 7 are four flat springs 39 having their free ends bearing resiliently on the spacing members 20 of the pivoted frames respectively, so that each frame is thus independently forced downwardly as viewed in Fig. 3, and the rollers 22, 26, 30 and 34 which are thus movably carried by the frames, are urged in a direction to put their respective tapes under tension and keep the same taut so that they may be effectively operated by the friction rollers 12 and thumb wheels respectively.

40 represents a suitable casing having an inclined top face 41 provided with an opening extending thereacross through which the characters on the tapes may be seen when they are moved beneath the opening. The opening is preferably divided into windows by a brass plate 42 secured to the casing and having window openings 43, 44, 45, and 46, through which the characters on the respective tapes may be seen. Arranged beneath the windows and back of the tapes is a guide member 47 extending across the device and provided with depending flanges 49, one at each end, by means of which the guide is rigidly secured to the side plates 4 and 5 respectively of the framework. The tapes pass between the guide plate 47 and the windows and are adapted to rest on the guide plate 47. It will be noted that all of the tapes, rollers, wheels 13, pivoted frames and springs 39 are carried by the framework so that all these parts may be inserted in and removed from the casing 40 as a unit. To secure the same in the casing, the side plates 4 and 5 of the framework are provided with lateral flanges 48 which are secured to the front and back of the casing by screws 50. At its upper edge the casing 40 is provided with four slots, 51, through which the upper portions of the thumb wheels 13 pass in order that they may be manually operated from the outside of the casing. The casing 40 substantially encloses all the mechanisms and may be covered with leather or other ornamental covering.

From the foregoing it will be seen that I have provided an arrangement which, in its preferred form, embodies a plurality of endless tapes having characters thereon visible through the casing, and a plurality of sets of rollers, one set for each tape, with one roller of each set having means 13 for rotating the same to move its tape to bring different characters thereon into view and with means whereby the axis of one roller of each set is movable, being carried by a pivoted frame, whereby the roller is held under tension, its spring 39 urging the frame and roller in a direction to maintain the tape under tension. It will also be noted that in the form shown the rollers 12 are all journalled on a common axis and the rollers 14, 15, 16 and 17 are likewise journalled on a common axis and the frames carrying the rollers 22, 26, 30 and 34 are journalled about the same axis.

While I have described my improvements in detail and with respect to a preferred embodiment, I do not desire to be limited to such details or embodiment since many changes and modifications may be made and the invention in its broader aspects may be embodied in widely different forms of devices and for various purposes. Hence I desire to cover all forms and embodiments coming within the language or scope of any one or more of the appended claims.

What I claim as new and desire to secure by Letters Patent, is:

1. The combination with a casing, of a frame, sets of rollers on said frame, each set of rollers defining the apex of a triangle, an indicia-bearing belt on one roller of each set, the belts defining sides of said triangle, means for holding said belts under tension, said frame with the thereby-carried rollers and belts being received by said casing as a unit, and means for actuating each of said belts.

2. The combination of a casing, a plurality of endless tapes in said casing and disposed in side-by-side relation, said tapes having characters thereon visible through the casing, a plurality of sets of rollers, one set for each tape, one roller of each set having means for rotating the same to move its tape to bring different characters thereon into view, and means whereby the axis of one roller of each set is movable and the roller is held under tension to keep its tape taut, said last mentioned means including a frame in which the roller is journalled, said frame being pivoted with respect to the casing, movement of each last named roller in tape-tautening direction being limited by the tape.

3. The combination of a casing with an inclined top face, a plurality of endless tapes in said casing, said tapes having characters thereon visible through said inclined top face, a plurality of sets of rollers in the casing, one set for each tape, one roller of each set being adjacent the upper edge of said face and one roller of each set being adjacent the lower edge of said face, and one roller of each set being positioned below the first roller thereof, means whereby said third mentioned roller of each set is urged downwardly to maintain the respective tapes under tension, and means whereby one roller of each set may be manually operated to independently operate the tapes to bring different characters thereon into view.

4. The combination of a framework, a plurality of sets of rollers journalled therein, a plurality of endless tapes, each tape passing over the rollers of one set respectively, means whereby one roller of each set may be independently manually operated to independently move the respective tapes with respect to the framework, and a casing substantially enclosing said framework, rollers and tapes, said casing being open on one face whereby the tapes may be viewed therethrough, a guide strip carried by the framework and arranged back of said opening, the tapes passing between said guide strip and said opening, and said framework with said tapes, and rollers being adapted to be inserted in and removed from said casing as a unit.

5. The combination of a framework, a set of rollers journalled about a common axis in said framework, another set of rollers journalled about another common axis in said framework, a plurality of frames pivoted about the last mentioned axis, a set of rollers having one roller thereof carried by each of said frames, and a plurality of endless tapes, each tape passing over one roller of each set.

6. The combination of a framework, a set of rollers journalled about a common axis in said framework, another set of rollers journalled about another common axis in said framework, a plurality of frames pivoted about the last mentioned axis, a set of rollers having one roller thereof carried by each of said frames, and a plurality of endless tapes, each tape passing over one roller of each set, and a plurality of springs for independently urging said frames in a direction to maintain the tapes taut.

7. The combination with a casing, of a frame, sets of rollers on said frame, each set of rollers defining the apex of a triangle, an indicia-bearing belt on one roller of each set, the belts defining sides of said triangle, said frame with the thereby-carried rollers and belts being received by said casing as a unit, and means for actuating each of said belts.

In testimony whereof I have signed my name to this specification.

LOUIS V. ARONSON.